United States Patent
Roskind et al.

(10) Patent No.: US 8,325,623 B1
(45) Date of Patent: Dec. 4, 2012

(54) SYSTEM AND METHOD FOR REDUCING LATENCY DURING DATA TRANSMISSIONS OVER A NETWORK

(75) Inventors: James Roskind, Redwood City, CA (US); Michael A. Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 12/706,308

(22) Filed: Feb. 16, 2010

(51) Int. Cl.
*G01R 31/08* (2006.01)

(52) U.S. Cl. ....................... 370/252; 370/473

(58) Field of Classification Search .......... 370/230, 370/230.1, 235, 252, 473, 474
See application file for complete search history.

(56) References Cited

U.S. PATENT DOCUMENTS

| | | | |
|---|---|---|---|
| 5,961,605 A | 10/1999 | Deng et al. | |
| 6,205,120 B1 | 3/2001 | Packer et al. | |
| 6,215,769 B1 | 4/2001 | Ghani et al. | |
| 6,219,713 B1 | 4/2001 | Ruutu et al. | |
| 6,252,851 B1 | 6/2001 | Siu et al. | |
| 6,341,129 B1 | 1/2002 | Schroeder et al. | |
| 6,446,121 B1 | 9/2002 | Shah et al. | |
| 6,646,987 B1 | 11/2003 | Qaddoura | |
| 6,788,704 B1 | 9/2004 | Lindsay | |
| 6,925,060 B2 | 8/2005 | Mangin | |
| 6,958,997 B1 | 10/2005 | Bolton | |
| 6,996,624 B1 * | 2/2006 | LeCroy et al. | 709/231 |
| 7,013,346 B1 * | 3/2006 | Tucker | 709/236 |
| 7,142,536 B1 | 11/2006 | Gossett et al. | |
| 7,174,386 B2 | 2/2007 | Cunningham et al. | |
| 7,225,266 B2 | 5/2007 | Ameigeiras et al. | |
| 7,296,206 B2 * | 11/2007 | Miyake et al. | 714/748 |
| 7,505,412 B2 * | 3/2009 | Miyake et al. | 370/236 |
| 2002/0112057 A1 | 8/2002 | Srinivas et al. | |
| 2004/0128346 A1 | 7/2004 | Melamed et al. | |
| 2008/0075000 A1 | 3/2008 | Robbins | |
| 2008/0089230 A1 | 4/2008 | Kootstra | |

OTHER PUBLICATIONS

Huston, TCP—How it works, The ISP Column (2004).
Paxson et al., RFC 2581—TCP Congestion Control, http://www.opalsoft.net/qos/TCP-1010 (2009).

* cited by examiner

*Primary Examiner* — Ricky Ngo
*Assistant Examiner* — Christine Ng
(74) *Attorney, Agent, or Firm* — Lerner, David, Littenberg, Krumholz & Mentlik, LLP

(57) ABSTRACT

A system and method is provided whereby more data packets than are necessary may be transmitted in order to prompt a node of network to more quickly increase the number of packets that will be accepted by the node. In one aspect, a single packet of data is split into multiple packets. In another aspect, a single packet of data is padded so that multiple packets need to be sent.

19 Claims, 17 Drawing Sheets

SYSTEM AND METHOD FOR REDUCING LATENCY DURING DATA TRANSMISSIONS OVER A NETWORK

BACKGROUND OF THE INVENTION

The Internet protocol suite is a well known and widely used suite of protocols for servicing data transmissions between two devices communicating information over the Internet. In particular, the Transmission Control Protocol or TCP is a part of the Internet protocol suite that provides for connection-oriented, reliable, and ordered delivery of a stream of information (i.e., payload data) between, for example, a web-browser application running on a client device and a web-server application running on a server device over a local or wide area network.

To communicate with a server device using the TCP protocol, a client device must first establish a TCP connection with the server. After a TCP connection is established, each device may transmit information to the other device in a sequence of discrete data packets, where each data packet contains a header portion and a data portion.

To ensure efficient communication, the TCP protocol incorporates several mechanisms that determine the amount of data (e.g., bytes) that may be transmitted in a single data packet, the flow or rate at which multiple packets are exchanged between the devices, and the effect of the packet transmissions on overall network congestion.

For example, the maximum amount of payload data that a sending device may transmit in the data portion of a single data packet to a receiving device is governed by the maximum segment size ("MSS") value. By convention, the default MSS value is typically understood to be 1430-1460 bytes, but a larger or smaller MSS value may be set by the receiving device (based on its capabilities to receive a larger or smaller amount of data from the sending device in a single packet) and communicated to the sending device during the initial process of establishing the TCP connection. Once the MSS value is established, a sending device may not transmit a data packet where the data portion of the packet contains an amount of payload data exceeding the MSS value of the receiving device.

Another mechanism provided by the TCP/IP protocol to ensure reliable communication between two devices communicating over the network in accordance with the protocol is the acknowledgement mechanism, where each device acknowledges the reception of data received from the other device. For efficiency and in order to reduce network congestion, the receiving device typically does not send a separate acknowledgement for each data packet that it receives from the sending device. Rather, the acknowledgement mechanism of the TCP protocol is conventionally implemented such that the receiving device will delay transmitting an acknowledgment until it receives at least two data packets from the sending device. The delayed acknowledgement, when transmitted, typically acknowledges the reception of the data contained in two consecutive packets.

A sending device can often fit all of its data into a single packet, in which case it has only one packet to send. Accordingly, if the receiving device receives the first packet but does not receive a second packet, the receiving device will send an acknowledgement indicating the reception of the first packet after waiting for a prescribed amount of time (typically around 200 ms) for the second packet to arrive.

If the data acknowledged by the receiving device does not match the data that was transmitted (for example, if the receiving device only acknowledges the data in one packet when two data packets were transmitted by the server), the sending device retransmits the unacknowledged data packet to the receiving device, until all transmitted data is successfully acknowledged by the receiving device. Furthermore, if the sending device does not receive an acknowledgement within a prescribed period of time (because, for example, the client's acknowledgement packet is lost in transmission, or because none of the data packets transmitted by the server were received at the client device), the sending device retransmits unacknowledged data packets to the receiving device after waiting for an acknowledgement for a prescribed amount of time. The amount of time that the sending device waits prior to retransmitting the unacknowledged data packet is dynamically determined by the sending device based on estimated network conditions.

The mechanism known as the congestion window ("CW") is another aspect of the TCP protocol that is designed to increase efficiency. Rather than defining the maximum size of the packet, the CW defines the maximum amount of data that a sending device (e.g., a server) may transmit at any given time to a receiving device (e.g., a client) before having to wait for an authorization from the receiving device to send more. In this regard, the CW comprises the maximum number of unacknowledged packets that a sending device may transmit to a receiving device in series prior to having to wait for an acknowledgement from the receiving device, where the maximum amount of data contained in each of the transmitted packets is based upon the MSS value of the receiving device.

In particular, some conventional implementations of the TCP/IP protocol set the CW to an initial default value of two (2) packets. Thus, a sending device may initially send two unacknowledged data packets to a receiving device and then must wait for an acknowledgement of those packets prior to sending any remaining packets. Upon receiving an acknowledgement for the initial two packets, the sending device may increase the value CW and transmit a larger number of the remaining packets in series prior to having to again wait for another acknowledgement from the receiving device.

The value of CW is typically increased by the number of packets that are acknowledged. Thus, for example, once the server receives an acknowledgement indicating the reception of the initial two packets, the server may increase the initial CW value (2 packets) by the number of acknowledged packets (2 packets), resulting in a new CW value of four (4) packets. Consequently, the server may now transmit four packets in a sequence to the client prior to having to wait for another acknowledgment.

The process of increasing the value of CW by the number of the acknowledged packets can theoretically continue indefinitely, until all available payload data has been successfully transmitted from the sending device to the receiving device. In the event that the sending device determines that one or more transmitted packets have been lost (i.e., because the transmitted packets have not been acknowledged by the receiving device within a prescribed period of time or because a negative acknowledgement is received), the value of CW is conventionally reduced by half (attributing the loss to congestion on the network) and the unacknowledged packets are retransmitted by the sending device in accordance with the reduced value of CW.

BRIEF SUMMARY OF THE INVENTION

In one aspect, a method of transmitting packets over a network is provided. The method includes: receiving first data to be transmitted via the network to a client device; determining a first value with a processor, the first value based upon a number of data packets that will be acknowledged by the client device prior to receiving additional packets; determining a second value with the processor, where the second value is based upon a maximum data size of a data packet; determining, based on the first and second values, whether the minimum number of data packets necessary to transmit the first data to the client device is less than the first value; transmitting, based on the determination that the minimum number data packets necessary to transmit the first data is less than the first value, the first data to the client device in a plurality of data packets greater than or equal to the first value via the network.

In another aspect, a system is provided that includes a memory storing instructions and data, the data comprising first data to be transmitted over a network to a client device; and a processor to execute the instructions and to process the data. The instructions include: receiving first data to be transmitted via the network to a client device; determining a first value with a processor, the first value based upon a number of data packets that will be acknowledged by the client device prior to receiving additional packets; determining a second value with the processor, where the second value is based upon a maximum data size of a data packet; determining, based on the first and second values, whether the minimum number of data packets necessary to transmit the first data to the client device is less than the first value; transmitting, based on the determination that the minimum number data packets necessary to transmit the first data is less than the first value, the first data to the client device in a plurality of data packets greater than or equal to the first value via the network.

In a yet another aspect, a method for transmitting data is provided, the method including: receiving first payload data to be transmitted from a first node to a second node via a network, the first payload data having a size less than the maximum amount of payload data that will be accepted by the second node in a single data packet; and transmitting, from the first node to the second node via the network, a first data packet and a second data packet, where each of the first data packet and the second data packet include a portion of the first payload data.

In a yet another aspect, A method for transmitting data is provided, the method including: receiving first payload data to be transmitted via a network from a first node to a second node, determining whether the first payload data has a size less than the maximum amount of payload data that will be accepted by the second node in a single data packet; providing padding data based on the determining, where padding data includes data not intended to be discernable by a user associated with the second node; and transmitting, from the first node to the second node via the network, a first data packet and a second data packet, where at least one of the packets contains the first payload data and where at least one of packets contains the padding data.

In a further aspect, a system is provided, the system including: a first device at a first node of a network, the first device including a first memory storing a first set of instructions and a first processor that processes data in accordance with the first set of instructions; a second device at a second node of the network, the second computer comprising a second memory storing a second set of instructions and a second processor that processes data in accordance with the second set of instructions; the first device having access to first data to be transmitted over the network to the second device. Wherein, the first set of instructions include: receiving first data to be transmitted via the network to a client device; determining a first value, the first value based upon a number of data packets that will be acknowledged by the client device prior to receiving additional packets; determining a second value, where the second value is based upon a maximum data size of a data packet; determining, based on the first and second values, whether the minimum number of data packets necessary to transmit the first data to the client device is less than the first value; transmitting, based on the determination that the minimum number data packets necessary to transmit the first data is less than the first value, the first data to the client device in a plurality of data packets greater than or equal to the first value via the network. And wherein the second set of instructions include: receiving the plurality of packets transmitted by the first device via the network; transmitting an indication via the network to the first device that additional data may be sent; and displaying the first data to a user on a display.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

In one aspect, a system and method is provided whereby latency between a sending device and receiving device, such as but not limited to a server and a client exchanging information over a network, is reduced by splitting data that may be transmitted to the receiving device in a single data packet into multiple smaller data packets, so as to induce the receiving device to send an acknowledgment earlier than it would if only a single data packet was transmitted.

Figure 1:
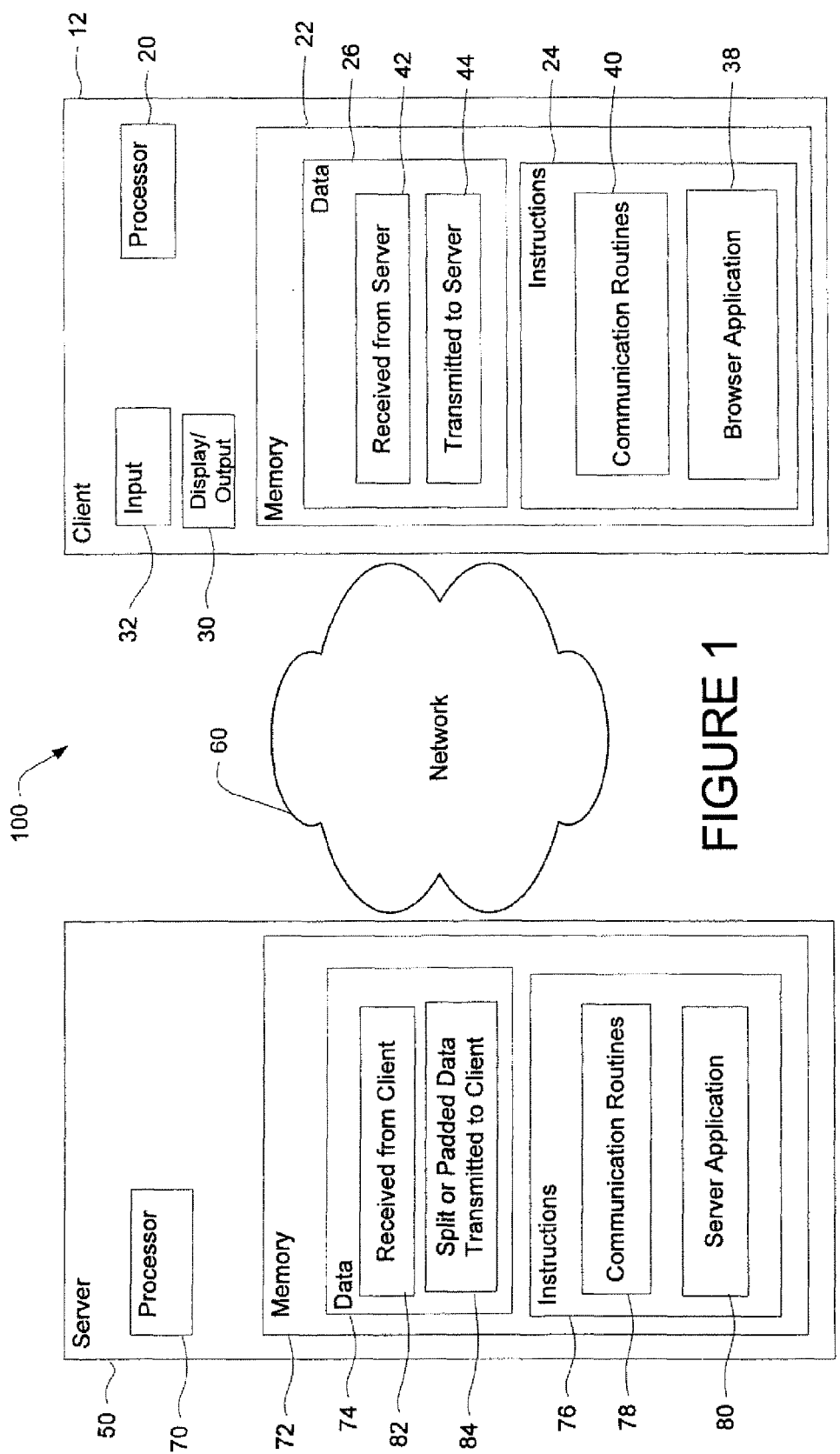
FIG. 1 is a block diagram of an exemplary embodiment of the system of FIG. 2.
Figure 2:
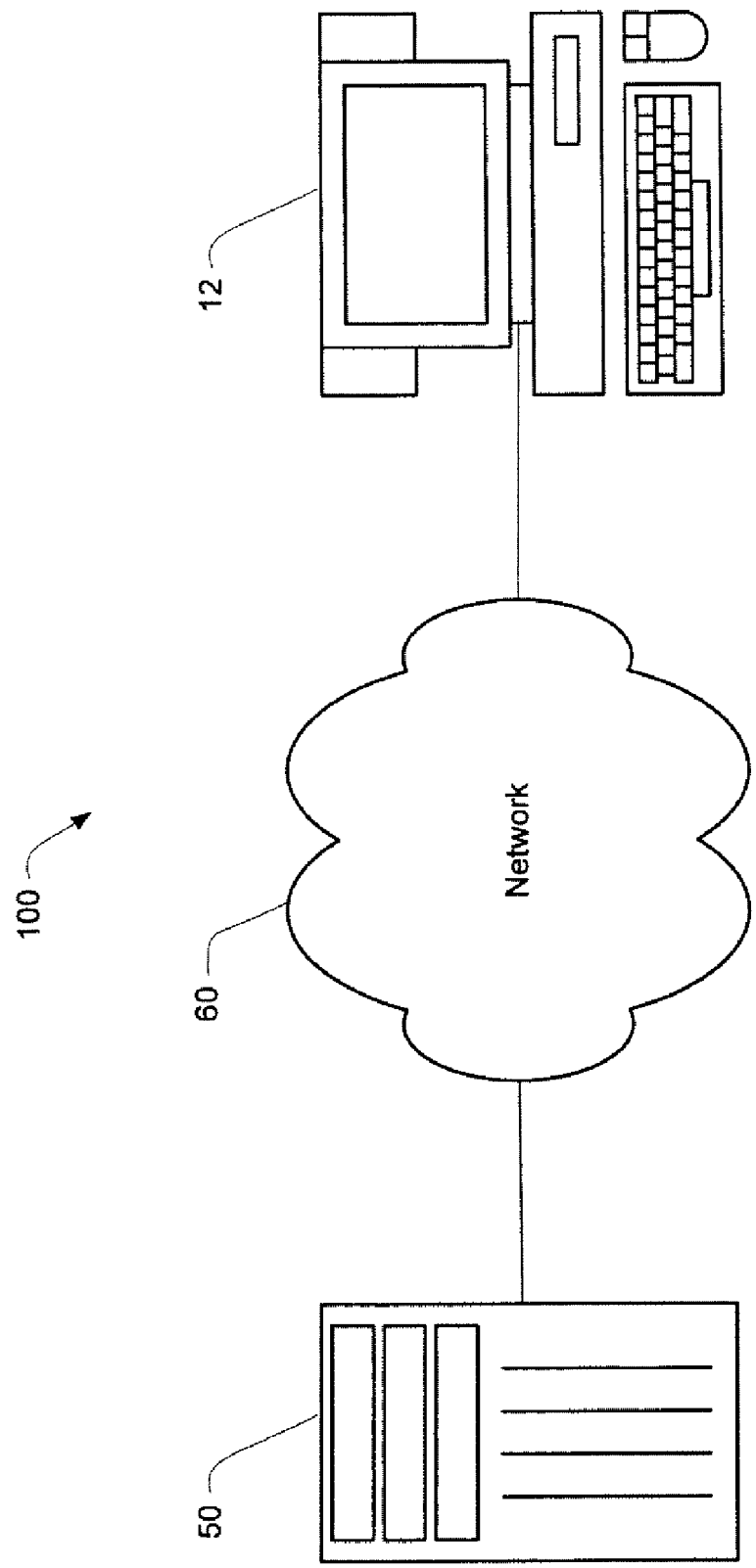
FIG. 2 is a block diagram of a system in accordance with an aspect of the present invention.

Referring to FIGS. 1-2, a communication system 100 in accordance with one aspect of the invention may provide for exchange of data between a client computer 12 and a server computer 50 over a communication network 60. The client computer 12 contains a processor 20, memory 22 and other components typically present in general purpose computers. In addition, the server 50 contains a processor 70 and a memory 72.

The memory 22 stores information accessible by the processor 20, including instructions 24 that may be executed by the processor 20 and data 26 that may be retrieved, manipulated or stored by the processor 20. Similarly, the memory 72 stores information accessible by processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable, read-only memories.

The processors 20, 70 may comprise any number of well known processors, such as processors from Intel Corporation. Alternatively, the processors may be a dedicated controller such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 26, 74 may be retrieved, stored or modified by the processors 20, 70 in accordance with the instructions 24, 76, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 2 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, the client computer 12 may be a general purpose computer, intended for use by a person, having all the internal components normally found in a personal computer such as a central processing unit (CPU), display 30, input 32 such as a CD-ROM drive, mouse, keyboard or microphone, and a hard-drive, speakers, modem and/or router (telephone, cable or otherwise) and all of the components used for connecting these elements to one another. Moreover, computers 50, 12 in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 1 are the mouse and keyboard, other means for inputting information from a human into a computer are also acceptable such as a microphone, touch-sensitive screen, voice recognition, position or orientation sensitive devices including accelerometers, etc.

The server 50 and the client computer 12 are capable of direct and indirect communication, such as over the network 60. Although only a single client computer and a single server are depicted in FIGS. 1 and 2, it should be appreciated that a typical system can include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks cards and wireless interfaces.

In accordance with one aspect of the invention, instructions 76 in server 50 may include a search engine 78 application and communication routines 80. The search engine receives search queries and generates search results in response, such as the search results provided by Google.com. While particularly advantageous when used in connection with search engines, it will be understood that the system and method is not limited to any particular application.

The communication routines 80 assist in the receipt and transmission of the information, such as placing the results into the payload data portion of a data packet and transmitting the results to a web-browser application running on the client device in accordance with the TCP communication protocol. In this regard, the functions of sending, receiving and processing the TCP packets may be accomplished using communication routines provided by operating systems such as Linux and Microsoft Windows.

Data 74 in the server 50 may include data 82 received from client 12 over network 60. The data 82 received from client 12 may include a search request that is input by a user into a web-browser application running on the client device and directed to the search engine running on the server device.

Data 74 may also include data 84 to be transmitted from the server device 50 to the client device 12 over network 60. The data to be transmitted from the server to the client may include padded or split payload data generated by the search engine in response to the search request. The payload data may include, for example, webpage formatting data and search results data generated by the search engine in response to the search request.

Instructions 24 in client 12 may include a web-browser application 38 and communication routines 40. The web-browser application 38 may communicate a search request, input by a user into the web-browser and directed to the search engine running on the server, to the communication routines 40, which may service data transmissions between client 12 and server 50 and transmit the search request to the search engine running on the server device in accordance with the TCP communication protocol. The web-browser application may also format and display, to the user, the payload data received from the server in response to the search request, as part of one or more web-pages.

The communication routines 40 assist in the receipt and transmission of the information from the client device to the server device. For example, the communication routines 40 may place the search request into the data portions of one or more data packets and transmit the packets to the search engine application running on the server device in accordance with the TCP communication protocol. In this regard, the functions of sending, receiving and processing the TCP packets may be accomplished using communication routines provided by operating systems such as Linux and Microsoft Windows.

Data 26 in the client computer 12 may include data received by the communication routines 40 from server 50 over the network. The data 42 received from the server may include padded or split payload data generated by the search engine running on the server in response to a search request.

Data 26 may also include data 44 to be transmitted via the communication routines 40 from the client 12 to the server 50 over the network 60. The data 44 to be transmitted to the server may include a search request input by a user into the web-browser running on the client device.

An exemplary operation in accordance with the process shown in FIG. 17 and various aspects of the invention follows below. It should be understood that the following operations do not have to be performed in the precise order described below. Rather, various steps can be handled in reverse order or simultaneously.

In accordance with a aspect, when the size of the payload data initially available for transmission from the server to the client is less than the MSS value of a single data packet, the server may split and transmit the initially available data in two data packets (even though it could be sent in one packet), where each of the two transmitted data packets includes a portion of the initially available payload data.

As indicated earlier, conventional implementation of the TCP protocol provides for one acknowledgement for every two data packets received at the client. In addition, the initial and default number of packets that a server may transmit to a client during the first transmission of data is typically two data packets due to the initial CW value of two (2). By splitting the payload data into two data packets even though all of the available payload data may be contained in a single data packet, the server induces the client computer to transmit an acknowledgement earlier, because the client does not have to wait a prescribed amount of time (typically 200 ms) for the second packet to arrive before sending an acknowledgement.

In many cases where the amount of the initially available payload data is less than the MSS of a single packet, splitting the available payload data into two packets may result in a client acknowledgement being received at the server relatively much earlier than it would otherwise.

For example, if only one packet was transmitted by the server containing all of the initially available data, the client will conventionally wait for a full 200 ms of time for a second data packet before acknowledging the reception of the one packet, which will proportionally delay the time at which the acknowledgement is received at the server by at least the same amount of time. In contrast, if the available payload data is split into two packets, the client will acknowledge the data contained in the two packets as soon as it receives both packets, which in many circumstances may result in the acknowledgement being received relatively much earlier at the server.

The relatively earlier reception of the acknowledgement at the server, in turn, enables the server to enlarge the value of CW and to transmit the remaining payload data, which, for a short transmission, typically becomes available in the meantime, relatively earlier in the subsequent transmission.

For example, receiving an acknowledgement for the first two packets 100 ms earlier than it would be received if only a single data packet was transmitted enables the server to increase the value of CW from two (2) to four (4) and transmit four data packets 100 ms earlier, where, in typical short transmissions, the four transmitted packets may contain all of the remaining portion of payload data responsive to a search request from the client. In contrast, if only a single packet had been transmitted initially, the server would have to wait at least 200 ms before it could send all of the same four packets, resulting in an overall larger latency. Thus, by inducing the client to send acknowledgements earlier when transmissions are short, data packets may be transmitted earlier from the server to the client, resulting in an overall reduction of latency from the perspective of a user at the client device.

Figure 14:
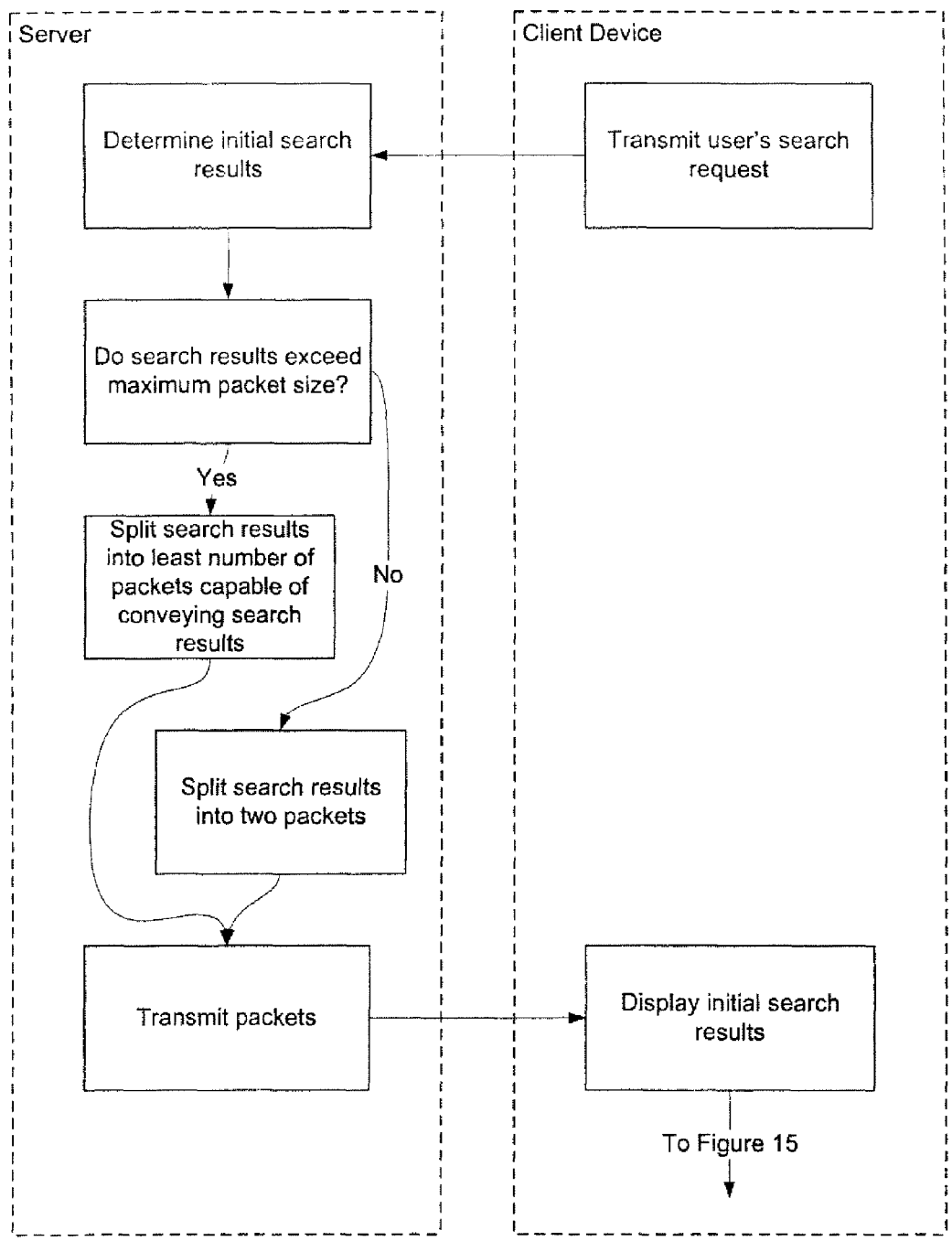
FIGS. 14-15 is a flow diagram of a process in accordance with one aspect of the present invention.
Figure 15:
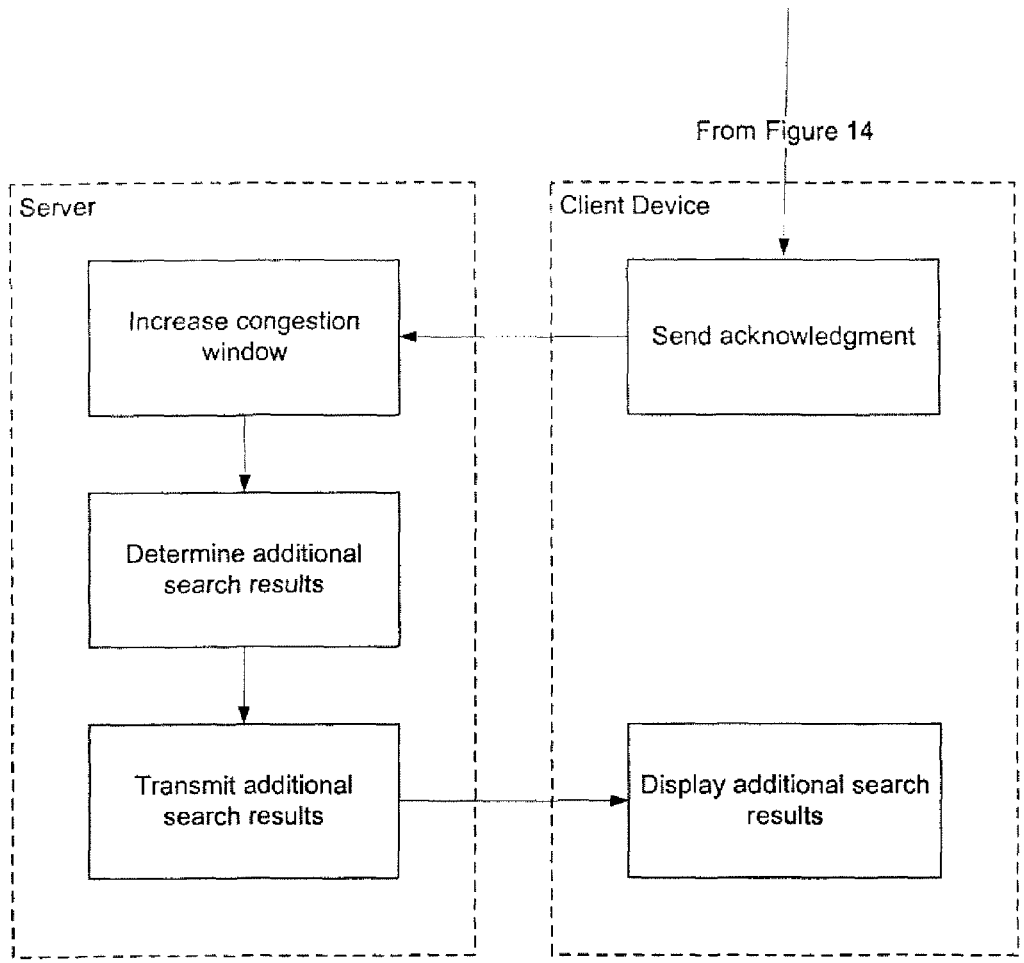

FIGS. 3-10 illustrate an exemplary embodiment of a transmission in accordance with the process of FIGS. 14-15.

Figure 3:
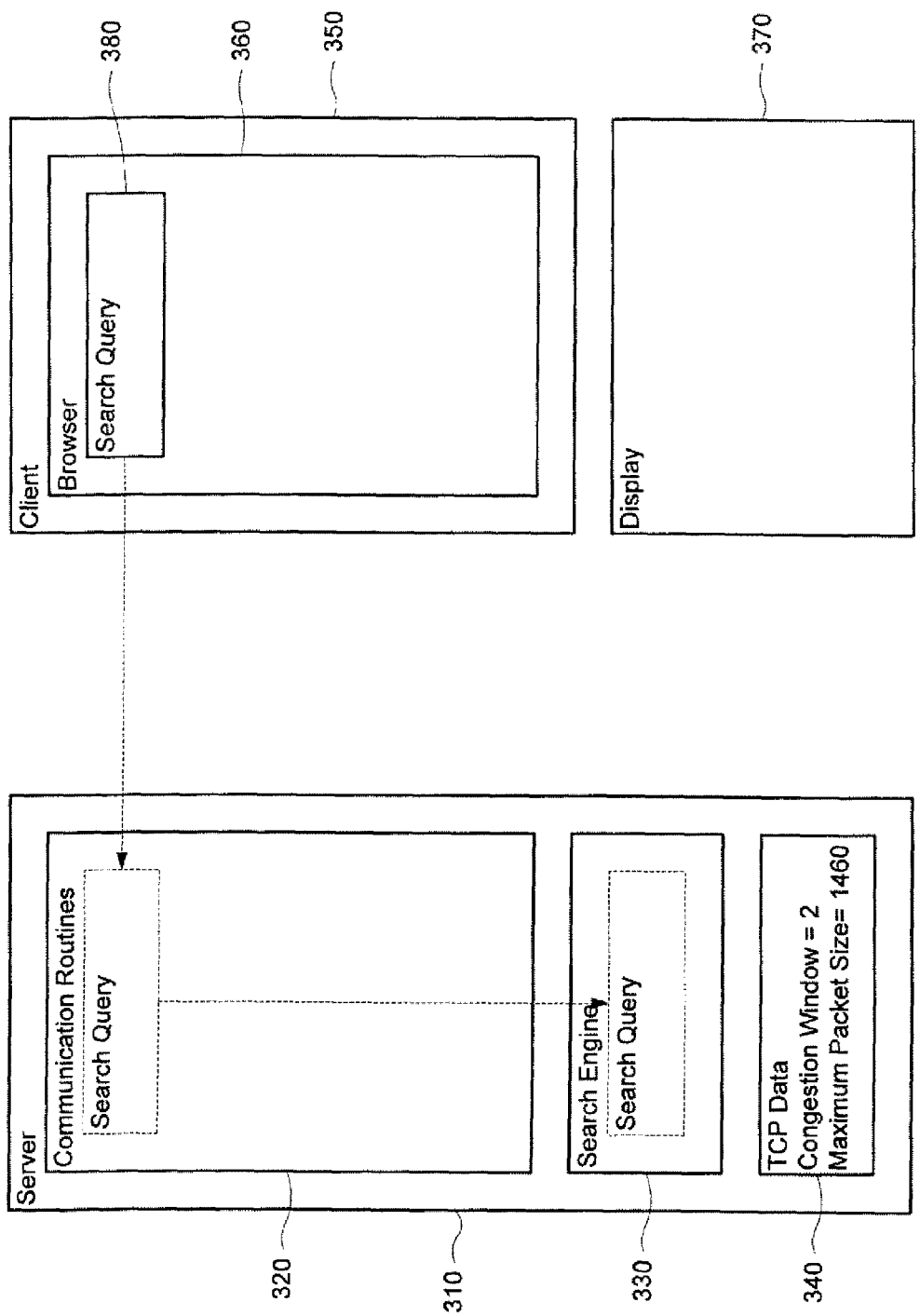
FIGS. 3-10 illustrate an exemplary operation in accordance with one aspect of the present invention.

At an initial time as shown in FIG. 3, client device 350 requests and receives information from server 310. For example, a user may use a browser 360 executed by client device 350 to log into a web site hosted by server 310 in order to transmit a search query 380 to the server's search engine 330 via web pages provided by the server. As shown by the dotted lines, the search query may be provided to the search engine 330 with the assistance of the communication routines 330.

In accordance with TCP/IP protocol, the server 310 and client device 350 may have already established values (shown as TCP data 340) indicating that the server side MSS value is 1460 bytes, and the CW value is initially set to 2.

Figure 4:
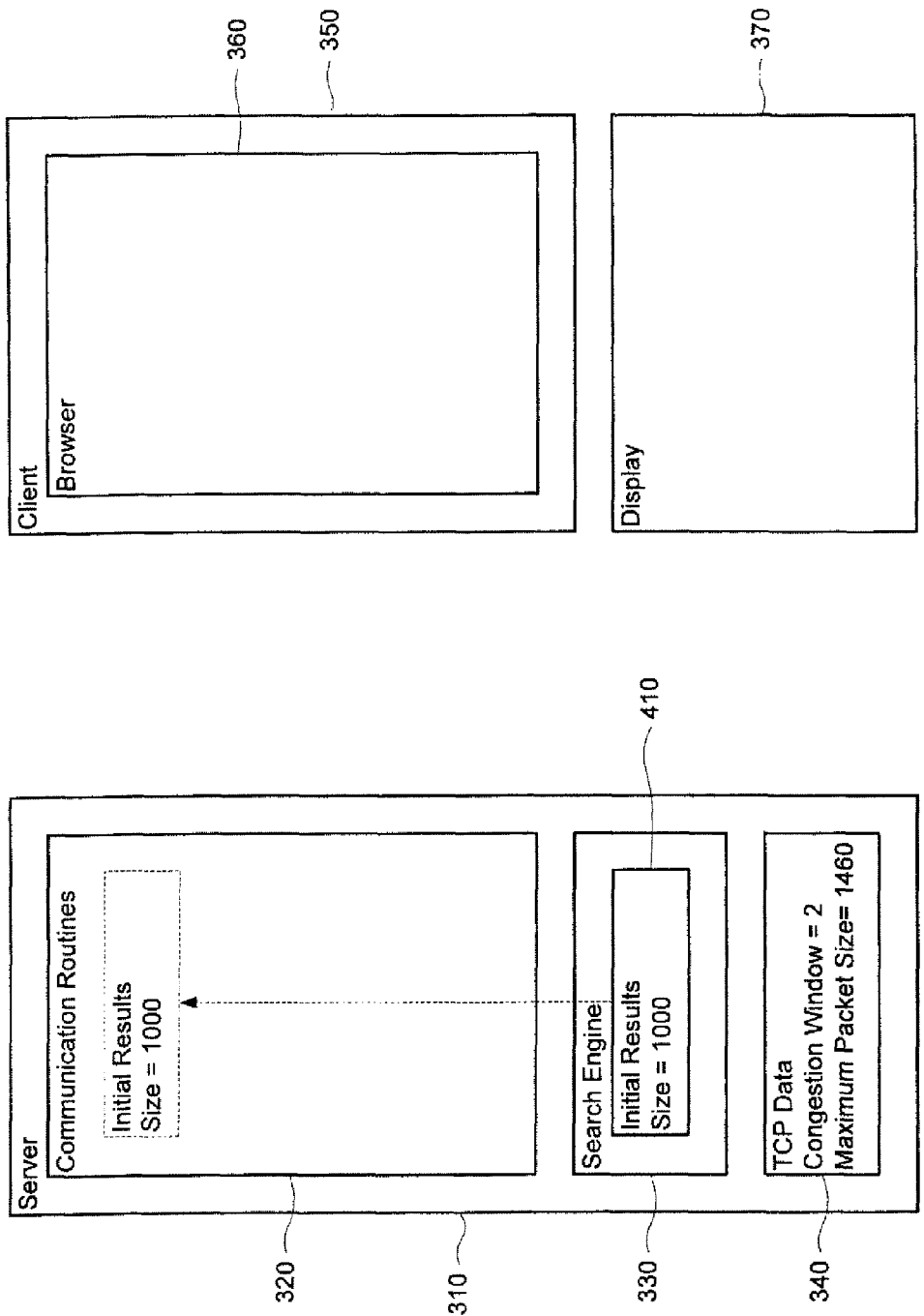

As shown in FIG. 4, the search engine 330 may generate initial results 410 responsive to search query 380 for display to the user on a web page and pass the results to the communication routines 320 for transmission before the remainder of the page is ready. For example, the initial results 410 may include information that can be transmitted quickly because it is completely or mostly independent of the user's query such as text and images that are always present at the top or bottom of the web page sent to the user. Instead or in addition, the initial results may include the first search results retrieved in response to the query, such as sponsored ads or non-sponsored results. It will be assumed for the purposes of the example that the initial results are less than the MSS, namely, the initial results are 1000 bytes compared to the MSS value of 1460 bytes.

In a typical prior art system and method operating in accordance with TCP/IP protocol, communication routines would parse the initial results into the least number of required packets. For example, in such a system and method, the initial results 410 may be sent immediately to the client device in a single packet because it is small enough to fit in a single packet. As a result of sending only one packet the client device will not acknowledge the packet before waiting for a prescribed amount of time for a second packet thus delaying or stalling the server device from increasing the congestion window.

Figure 5:
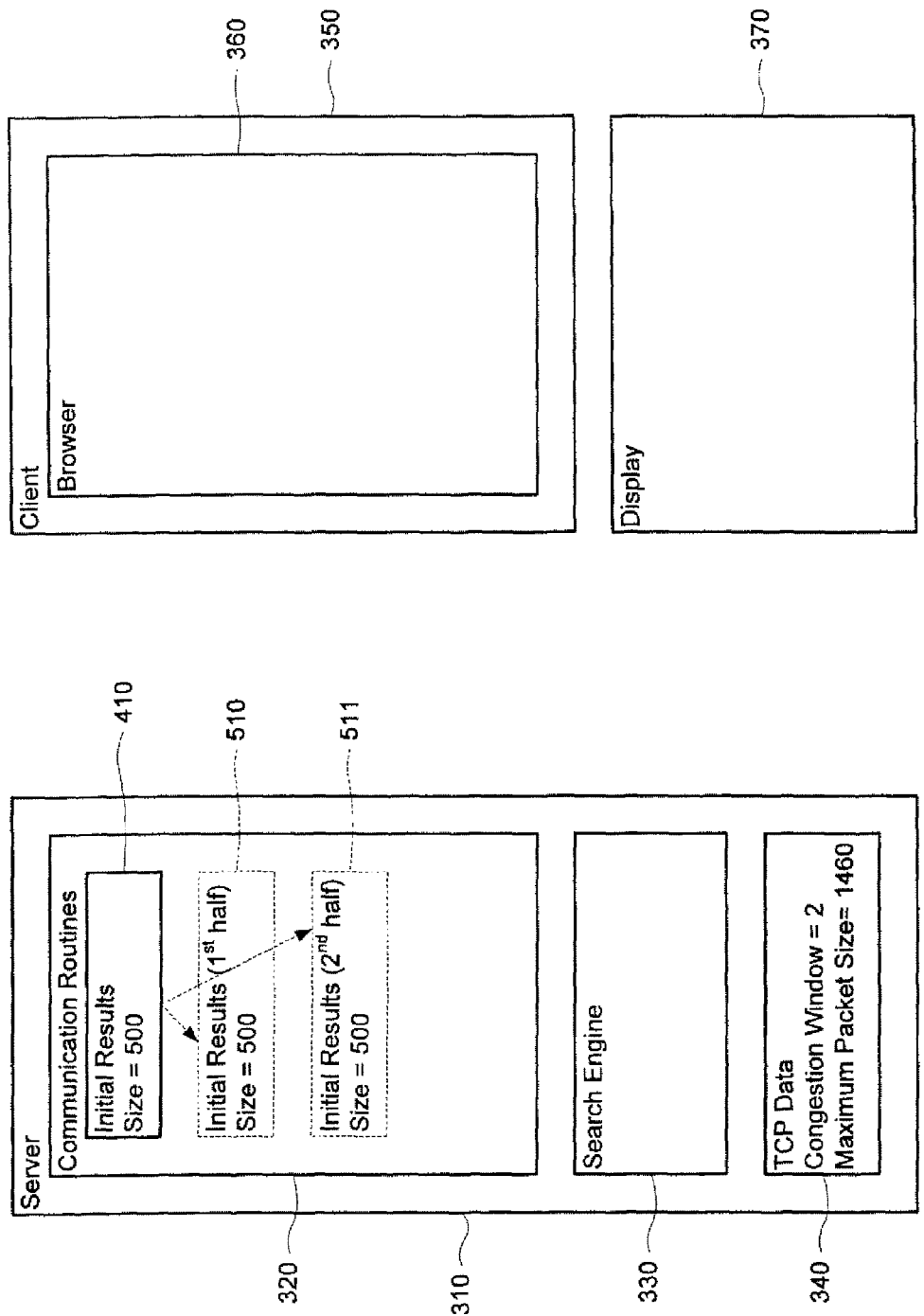

In accordance with one aspect of the present system and method, the server determines whether the initial results would fit within a single packet and, if so, splits the initial results into multiple packets each containing a different portion of the results. For example, as shown in FIG. 5, the server 310 splits the initial results 410 into two packets 510 and 511, each of which contains a different half of the results data. In this regard, it will be understood that the present invention is not limited to splitting the results into multiple packets each containing an equal portion of the results, and that the multiple packets may contain different amounts of the results without departing from the scope of the invention.

Figure 6:
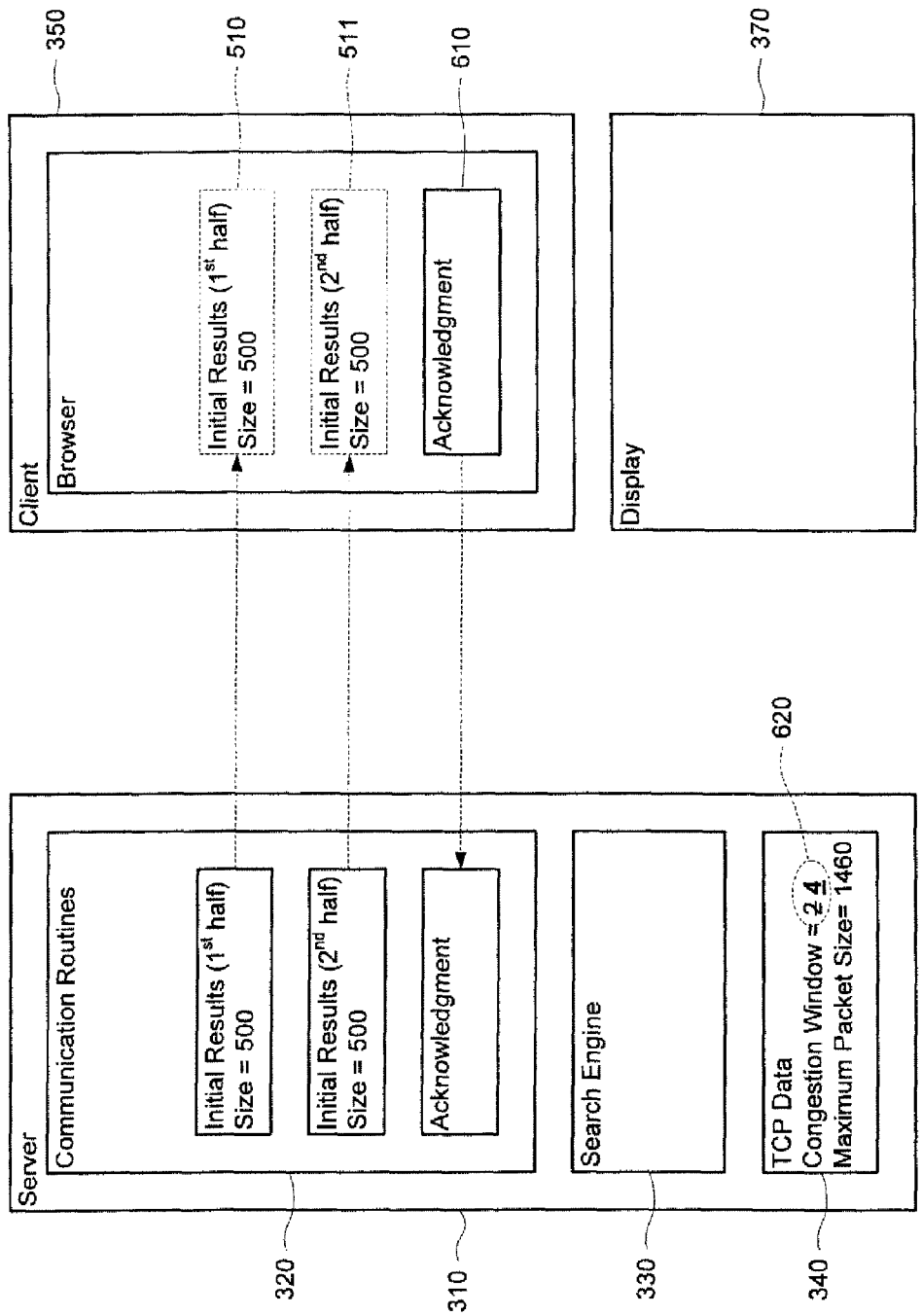

As shown in FIG. 6, the server 310 transmits the two packets 510-11 to client device 350. Because the client device has now received two packets, it will transmit an acknowledgment 610 to server 310 without waiting for any additional packets. In response to receiving the acknowledgement for packets 510-11, server 310 increases the value of the congestion window 620 from "2" to "4", i.e., the server may now transmit up to four packets to the client without waiting for another acknowledgement.

Figure 7:
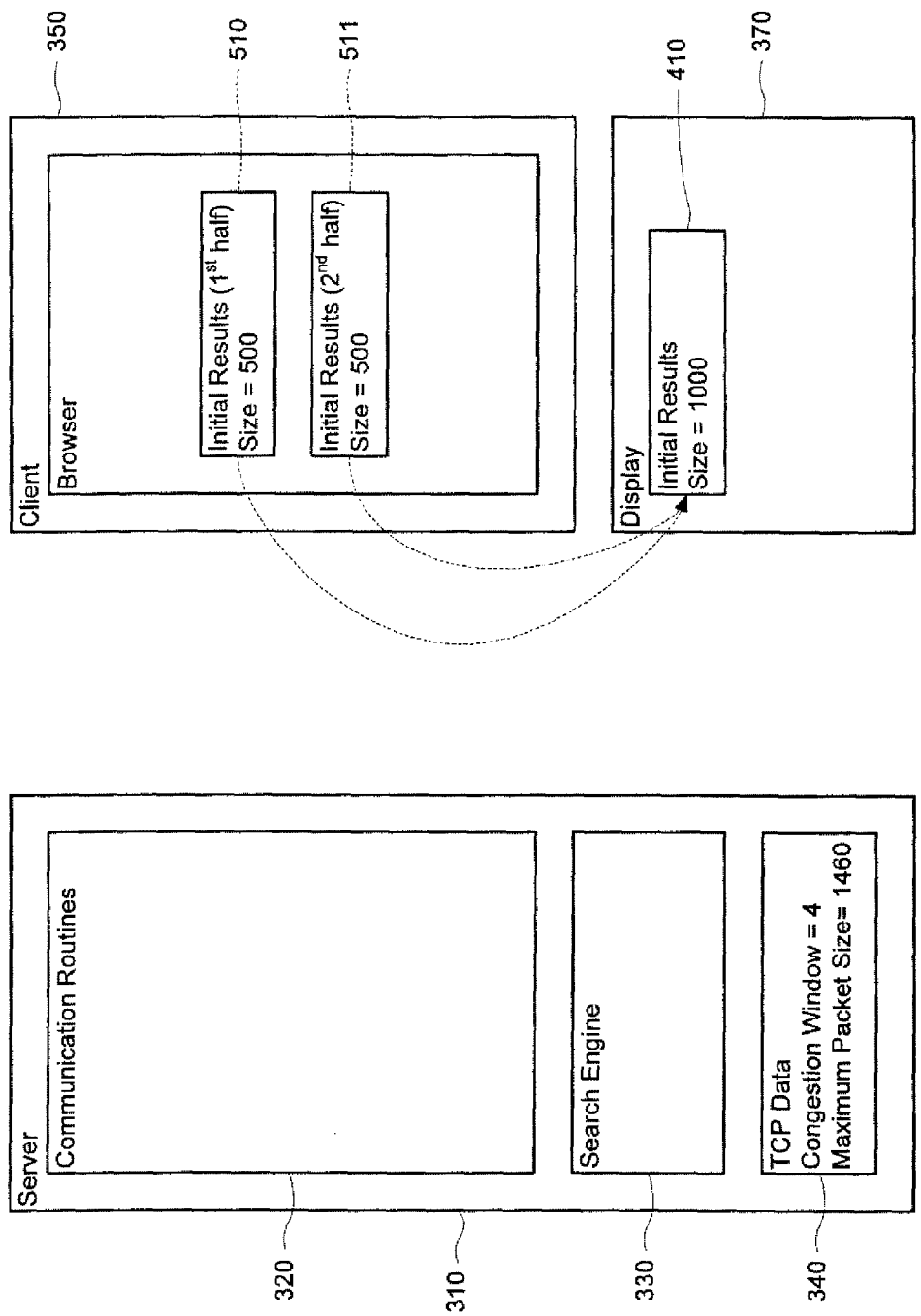

As shown in FIG. 7, the client may display both halves 510-511 of the initial results (i.e., all of the initial results 410) on the display 370 while awaiting additional results from the server.

Figure 8:
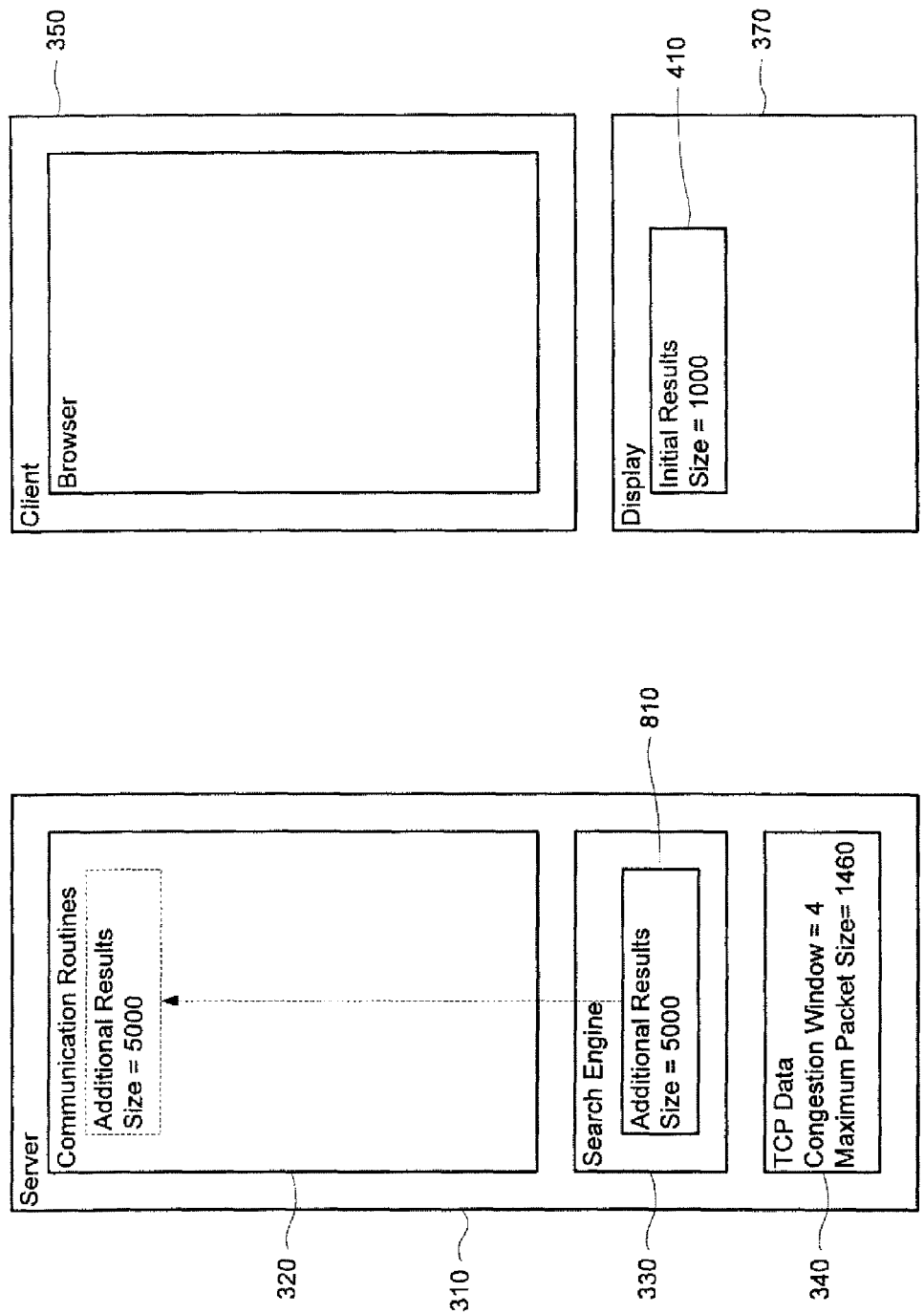
Figure 9:
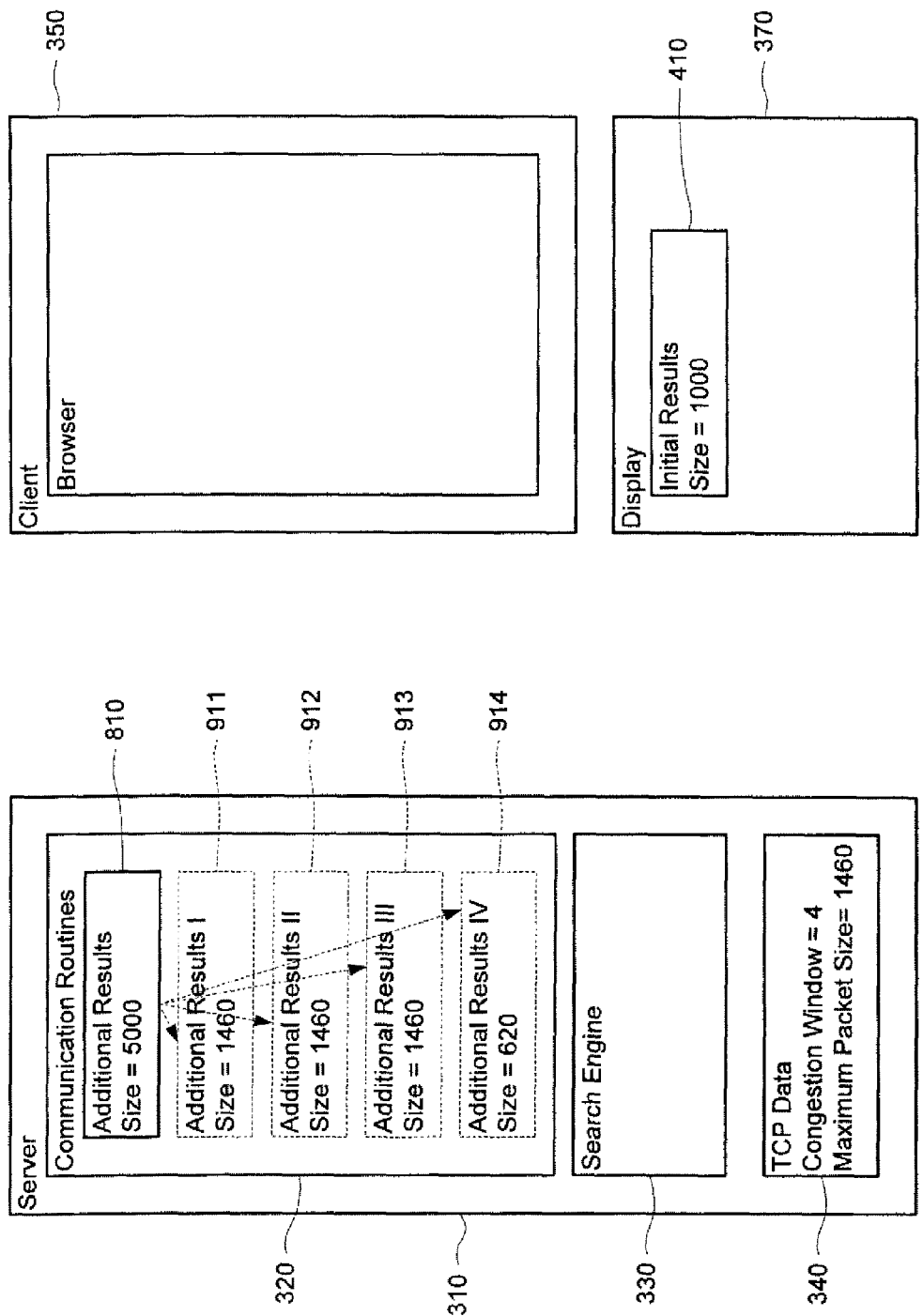

As shown in FIG. 8, the search engine 330 provides additional results 810 to communication routines 320 for transmission in response to the client device's original request. It will be assumed for the purposes of the example that the additional results are substantially greater than the MSS, namely, the additional results are 5000 bytes compared to the MSS value of 1460 bytes. Accordingly, as shown in FIG. 9, the communication routines 320 split the data into individual packets 911-914 sized to fit with the maximum packet size.

Figure 10:
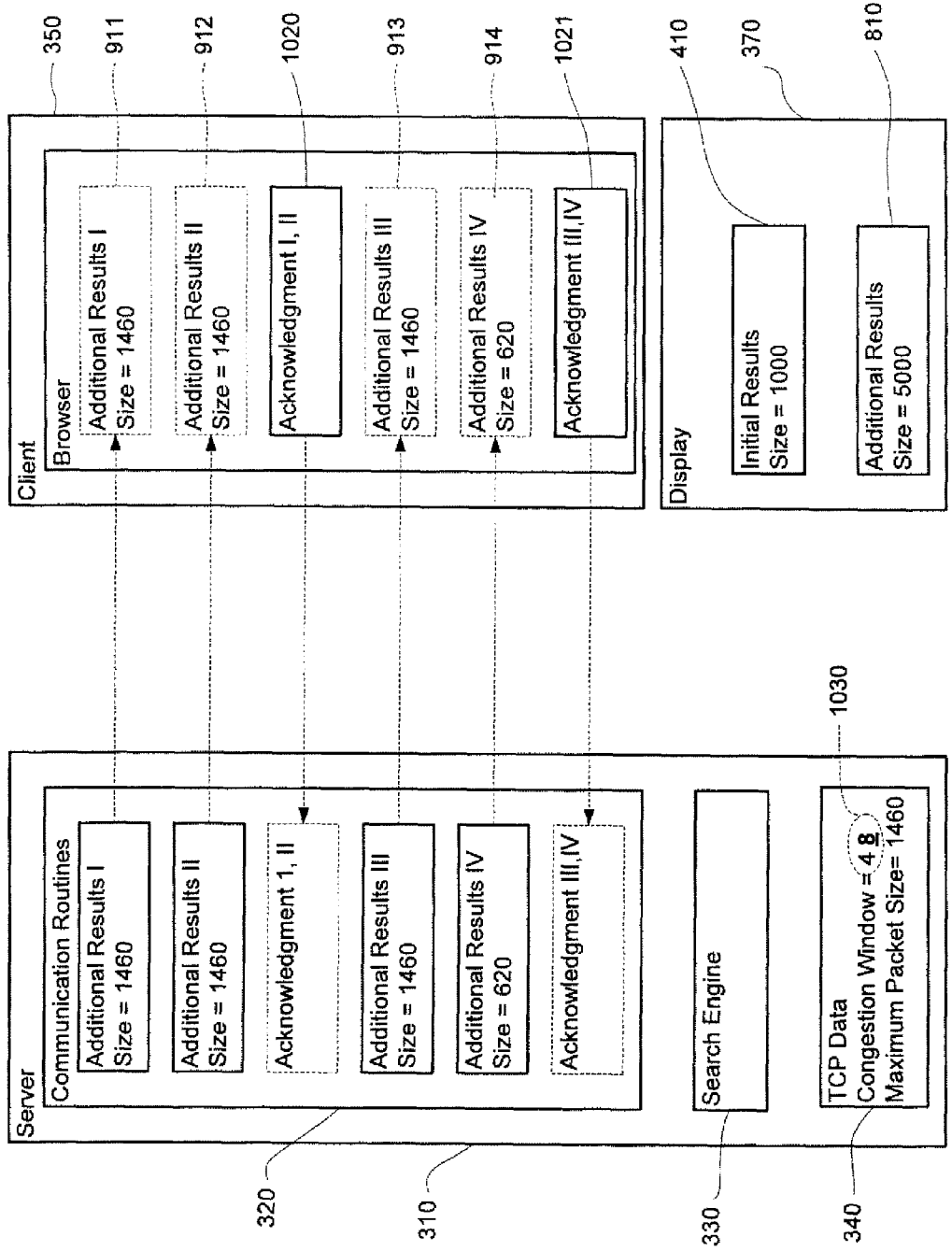

As shown in FIG. 10, the packets 911-914 of additional results are transmitted to the client device 350, which displays the additional results 810 along with the initial results 410 on the display 370. In response to receiving packets 911-914, client device 350 will transmit acknowledgements 1020-21 to the server device 310. In response to receiving acknowledgements 1020-21, server 310 may further increase the congestion window (such as by increasing the CW from four (4) to eight (8) as shown at reference number 1030).

Accordingly, by splitting the initial payload data into multiple packets when the server may have instead sent the entire payload in a single packet, the server in many cases facilitates an earlier transmission of an acknowledgement from the client, which allows the server to enlarge the congestion window and send the remaining portions of the payload data to the client at an earlier time.

In another aspect, the system and method will continue to determine the amount of packets required to induce the client device to send acknowledgements earlier than if the packets are sent at their maximum size. For example, if the size of the additional results in FIG. 9 was 1000 bytes (less than the MSS of 1460 bytes), the additional results may be split into two packets sized at 500 bytes each (thus inducing the client to send one acknowledgement in response), or even four packets sized at 250 bytes each (thus inducing the client to send two acknowledgements in response).

In another aspect of the system and method, instead of splitting the initially available payload data into two packets where the size of the initially available payload data is less than the MSS value of a single data packet, the server may instead append additional non-payload data to the payload data, where the non-payload data is data that is not requested by the client and is unrelated to the search request. The amount of the non-payload data that is appended to the payload data may be such that the total amount of the payload data and the non-payload data together exceeds the MSS value of a single data packet, but is less than or equal to the combined MSS value of two data packets. The server may then transmit two data packets to the client as before, but rather than splitting the payload data into two packets, in this case the first data packet includes all of the initially available payload data and a portion of the appended non-payload data, and the second data packet only includes the remaining portion of the appended non-payload data.

Figure 16:
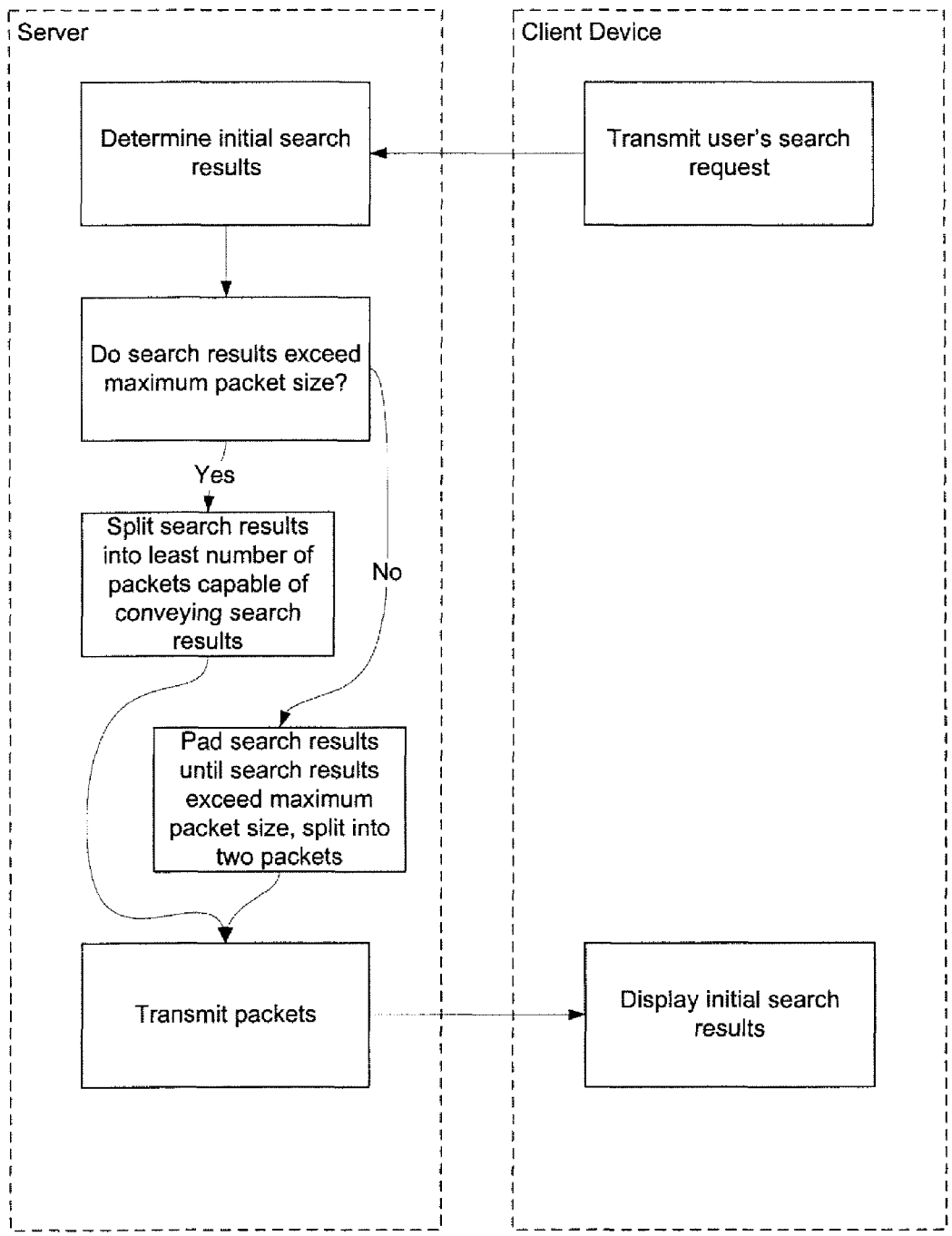
FIG. 16 is a flow diagram of a process in accordance with another aspect of the present invention.

FIGS. 11-14 provide an example of this aspect of the system and method in accordance with the process of FIG. 16. TCP/IP Routines 1120 may comprise communication routines, such as those present in certain existing operating systems that are preconfigured to use as few packets as possible to transmit data in accordance with TCP/IP protocol. Padding routine 1125 may comprise instructions that process data from the search engine 330 prior to it being provided to the TCP/IP Routines.

Figure 11:
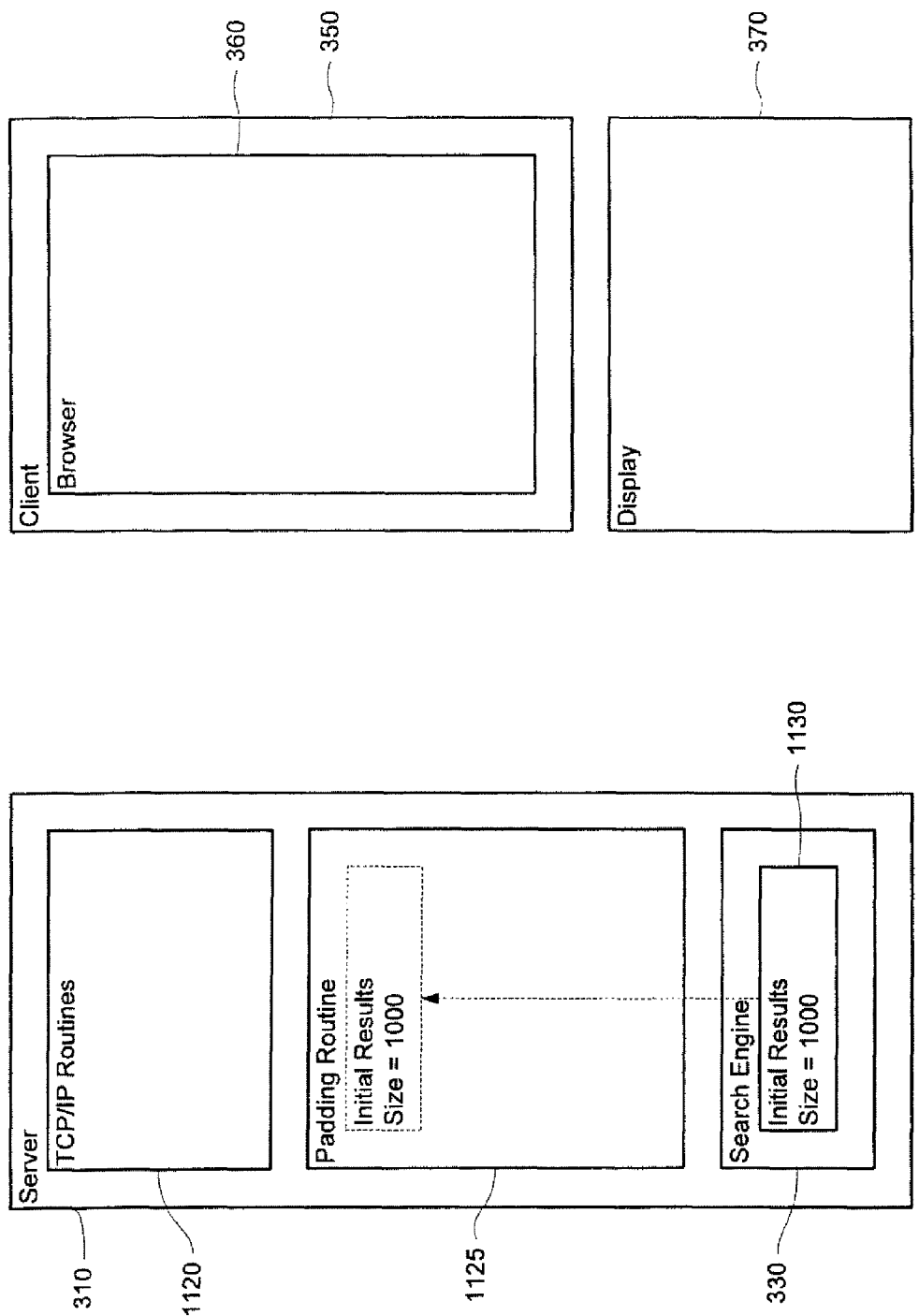
FIGS. 11-13 illustrates an exemplary operation in accordance with another aspect of the present invention.

As shown in FIG. 11 and by way of example, padding routine 1125 receives initial search results 1130 from the search engine 330 such that the search results are small enough (e.g., 1000 bytes) to be transmitted in a single packet.

Figure 12:
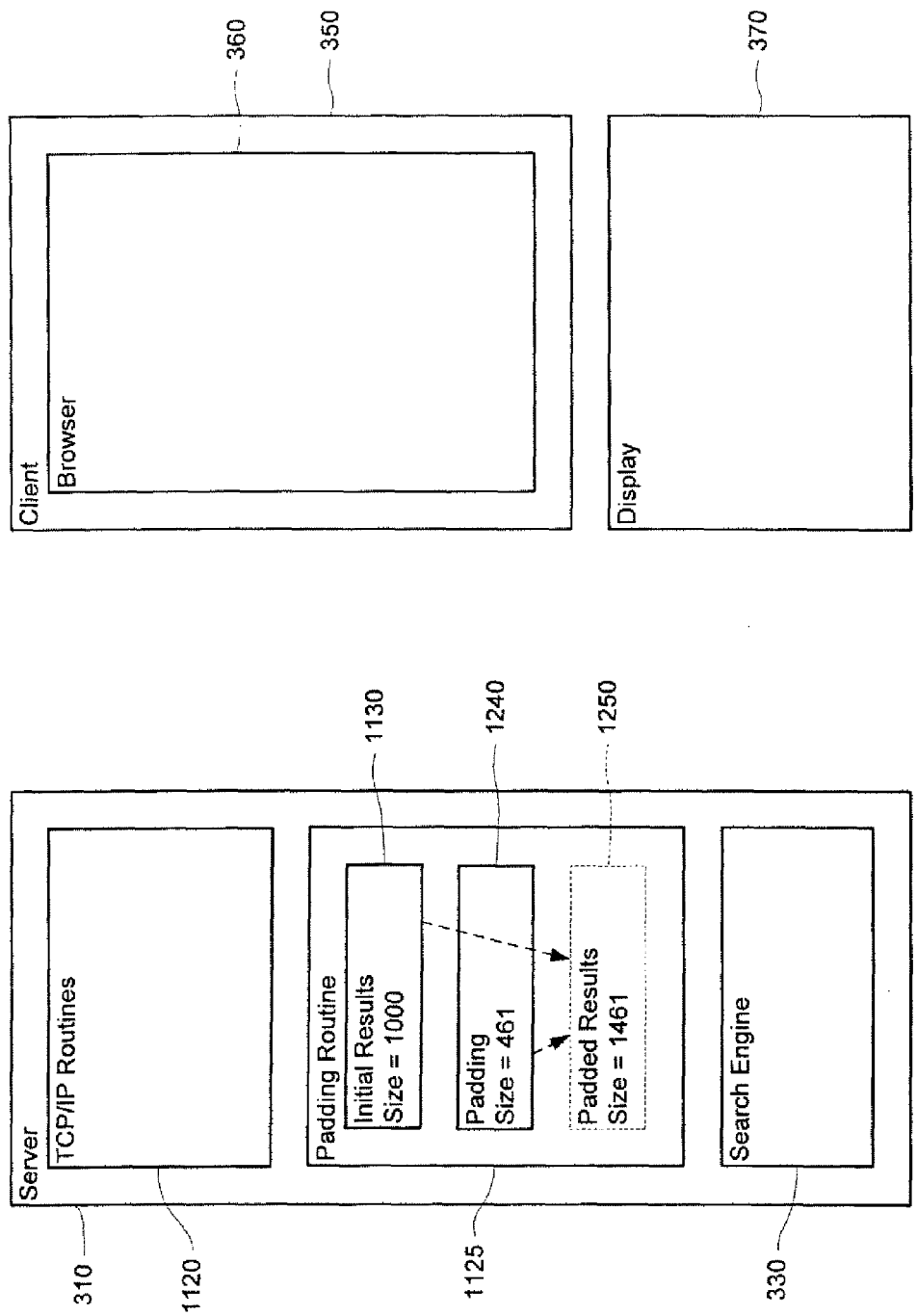

Because the initial results are small enough to be sent as a single packet, the server' padding routine 1125 may append information to the results until it is too large to fit within a single packet. As shown in FIG. 12, for example, server 310 may append padding data 1240 to the initial results 1130 to create padded results 1250. In one aspect of the system and method, the padding data comprises data that will be either removed by the client device prior to display or information that is difficult for a user to discern—or otherwise meaningless to the user if discerned—when displayed (by way of example only, null characters, space characters, pictures having 0 pixels, HTML header data, etc.). For example, if the initial results were 1000 bytes and the MSS was 1460 bytes, the server may append 461 bytes of null characters so that the combined results exceed the MSS.

Figure 13:
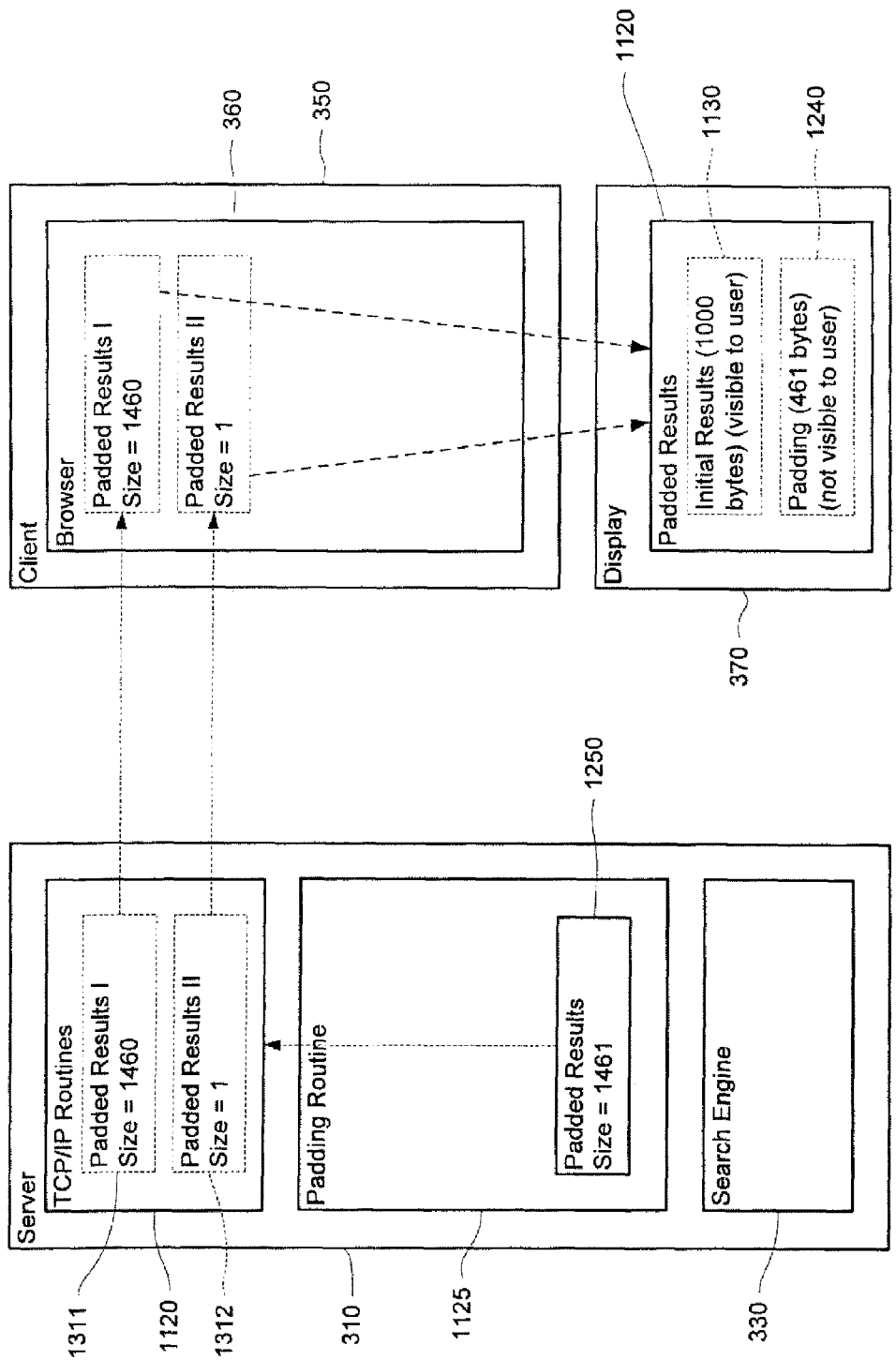

As shown in FIG. 13, the padded results 1250 are sent to the TCP/IP routines 1120, which packetize different portions of the padded results into two packets 1311-12 (because the size of the padded data exceeds the MSS of 1460). The server then transmits both packets to the client device 350, which displays the padded results to the user on display 370. As noted above, the padding may be selected so as to be essentially invisible to the user, in which case displaying the padded results causes the initial results 1130 be readily discernable to the user whereas the padding 1240 is not.

As before, based on receipt of the packets 1311 and 1312, the client computer 350 will transmit an acknowledgement acknowledging the reception of the data contained in the two transmitted packets. As a result, the server 310 increases the value of congestion window by the number of acknowledged packets. Appending additional data to the initial payload data thus enables the server to send more packets to the client device before waiting for another acknowledgment from the client device. Accordingly, in this aspect of the system and method, increasing the size of the requested data may actually reduce the latency for transmission and reception of the overall dataset.

Figure 17:
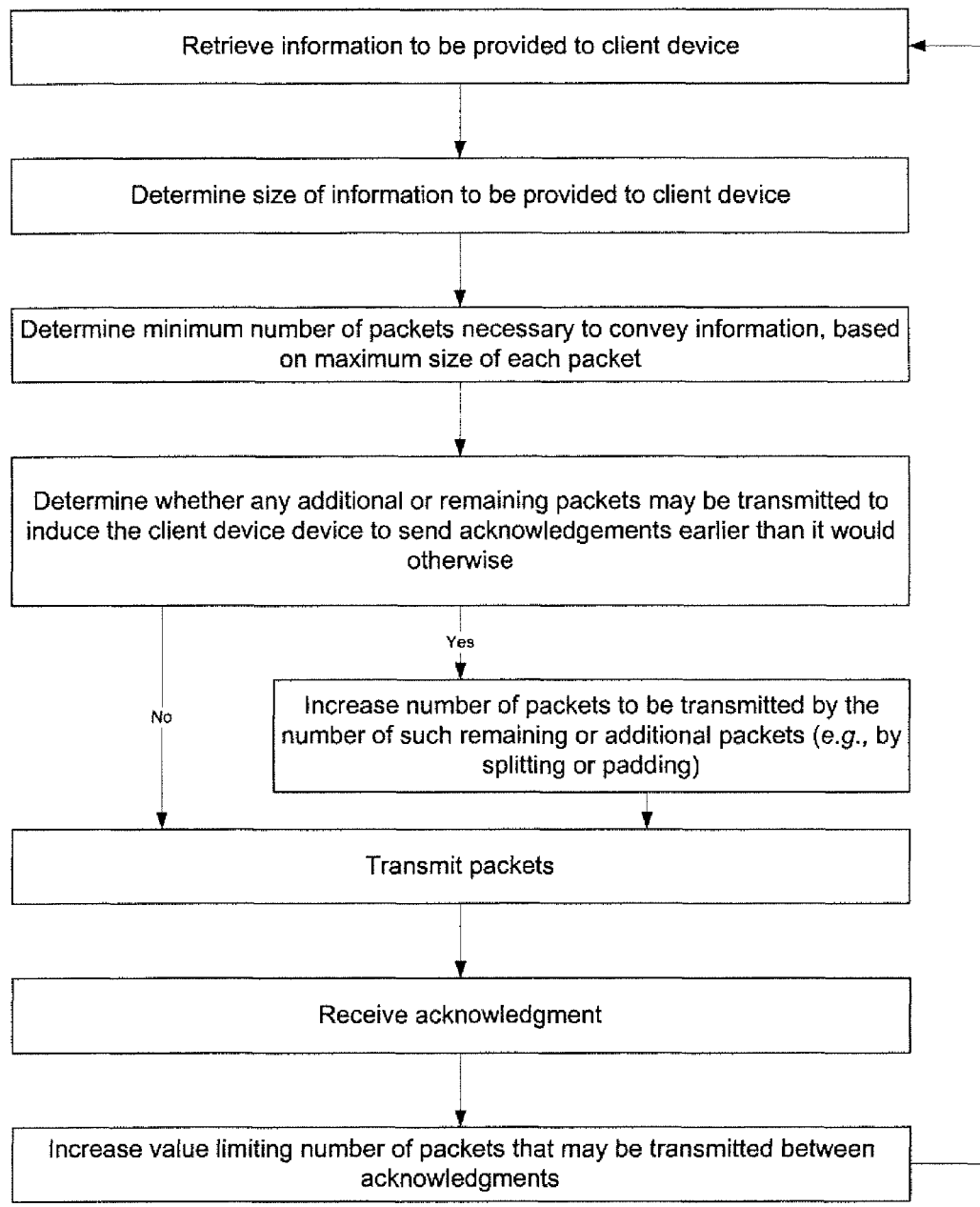
FIG. 17 is a flow diagram of a process in accordance with various aspects of the present invention.

FIG. 17 shows a process in accordance with various aspects of the invention. As shown therein, a sending device, such as, for example, a server, may receive information to be provided to a client device over, for example, a network. The sending device may determine the size of the information, and may also determine the minimum number of packets necessary to transmit the information to the client device, where the minimum number of packets is determined based on the maximum size of data that may be included in each of the minimum number of packets. After determining the minimum number of packets required, the sending device may also determine if any additional or remaining number of packets may be transmitted to the client in order to induce the client into sending an acknowledgement earlier, that is, without waiting to receive any more packets. If so, the sending device may increase the number of packets to be transmitted to the client device by the additional or remaining number of packets by either splitting or padding the information to be transmitted as disclosed herein above. The sending device may then transmit the information to the client by transmitting the increased number packets over the network. After the increased number of packets are transmitted to the client, the sending device and may receive one or more indications from the client that acknowledge the reception of the transmitted packets. Subsequent to receiving the one or more indications, the sending device may increase the maximum number of packets that may be transmitted to the client device by the number of the acknowledged packets in a subsequent transmission of information to the client device.

The aspects of the invention disclosed herein have the advantage of being flexible enough to accommodate a variety of alternatives. For example, the splitting or padding of data may be performed by the search engine, by the operating system or another routine on the sending device.

Yet further, the system and method may be used with client devices that operate in accordance with conventional implementations of the TCP/IP protocol. For example and in one aspect, the client device provides acknowledgements and permits increases in the size of the congestion window without determining (or without receiving any information indicating) that the packets were split or padded by the server. In another aspect, the client device implements routines that complement the actions of the server, such as searching for and removing padding data added by the server.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting packets over a network comprising:
receiving first data to be transmitted via the network to a client device;
determining a first value with a processor, the first value based upon a number of data packets that will be acknowledged by the client device prior to receiving additional packets;
determining a second value with the processor, where the second value is based upon a maximum data size of a data packet;
determining, based on the first and second values, whether a minimum number of data packets necessary to transmit the first data to the client device is less than the first value;
transmitting, based on the determination that the minimum number data packets necessary to transmit the first data is less than the first value, the first data to the client device in a plurality of data packets greater than or equal to the first value via the network.

2. The method of claim 1 wherein each packet in the plurality of packets contains a different portion of the first data and wherein the amount of first data in at least two of the transmitted packets is less than the maximum data size.

3. The method of claim 1 wherein the amount of first data is increased by appending padding data to the first data, where the padding data comprises data not intended to be discernable by a user of the client device, and wherein at least one packet of the plurality of packets includes a portion of the padding data.

4. The method of claim 1 wherein the first value is based upon a congestion window value determined in accordance with the TCP protocol.

5. The method of claim 1 wherein the acknowledgement received from the client device is an acknowledgement packet received via the network in accordance with the TCP protocol.

6. The method of claim 1 wherein the maximum data size of a data packet is based on an MSS value in accordance with the TCP protocol.

7. The method of claim 1, wherein the second value is determined such that the amount of first data included in at least one of the plurality of transmitted packets is equal to the maximum data size.

8. The method of claim 1, wherein the second value is determined such that the amount of first data included in all but one of the plurality of transmitted packets is equal to the maximum data size.

9. A system comprising:
a memory storing instructions and data, the data comprising first data to be transmitted over a network to a client device;
a processor to execute the instructions and to process the data; wherein the instructions comprise:
receiving first data to be transmitted via the network to a client device;
determining a first value with a processor, the first value based upon a number of data packets that will be acknowledged by the client device prior to receiving additional packets;
determining a second value with the processor, where the second value is based upon a maximum data size of a data packet;
determining, based on the first and second values, whether the minimum number of data packets necessary to transmit the first data to the client device is less than the first value;
transmitting, based on the determination that the minimum number data packets necessary to transmit the first data is less than the first value, the first data to the client device in a plurality of data packets greater than or equal to the first value via the network.

10. The system of claim 9 wherein each data packet in the transmitted plurality of packets contains a different portion of the first data and wherein the amount of first data in each of at least two of the plurality of packets is less than the maximum data size.

11. The system of claim 9 wherein the amount of first data is increased by appending padding data to the first data, where the padding data comprises data not intended to be discernable by a user of the client device, and wherein at least one data packet of the plurality of packets includes a portion of the padding data.

12. The system of claim 9 wherein the first value is based on a congestion window value determined in accordance with the TCP protocol.

13. The system of claim 9 wherein the acknowledgement received from the client device that additional packets may be sent is an acknowledgement packet received via the network in accordance with the TCP protocol.

14. The system of claim 9 wherein the maximum data size of a packet is based on an MSS value in accordance with the TCP protocol.

15. The system of claim 9, wherein the second value is determined such that the amount of first data included in at least one of the plurality of transmitted packets is equal to the maximum data size.

16. The system of claim 9, wherein the second value is determined such that the amount of first data included in all but one of the plurality of transmitted packets is equal to the maximum data size.

17. A system comprising:
a first device at a first node of a network, the first device comprising a first memory storing a first set of instructions and a first processor that processes data in accordance with the first set of instructions;

a second device at a second node of the network, the second computer comprising a second memory storing a second set of instructions and a second processor that processes data in accordance with the second set of instructions;
the first device having access to first data to be transmitted over the network to the second device;
wherein the first set of instructions comprise:
  receiving first data to be transmitted via the network to a client device;
  determining a first value with a processor, the first value based upon a number of data packets that will be acknowledged by the client device prior to receiving additional packets;
  determining a second value with the processor, where the second value is based upon a maximum data size of a data packet;
  determining, based on the first and second values, whether the minimum number of data packets necessary to transmit the first data to the client device is less than the first value;
  transmitting, based on the determination that the minimum number data packets necessary to transmit the first data is less than the first value, the first data to the client device in a plurality of data packets greater than or equal to the first value via the network;
and wherein the second set of instructions comprise:
  receiving, the plurality of packets transmitted by the first device via the network;
  transmitting an indication via the network to the first device that additional data may be sent; and
  displaying the first data to a user on a display.

18. The system of claim 17 wherein each packet of the plurality of packets transmitted from the first device to the second device via the network contains a different portion of the first data, and wherein the amount of first data in at least two of the transmitted packets is less than the maximum data size.

19. The system of claim 17 wherein the first instructions further comprise increasing the amount of first data by appending padding data to the first data, where the padding data comprises data not intended to be discernable by a user of the second device, and wherein at least one packet of the plurality of packets transmitted from the first device to the second device via the network includes a portion of the padding data.

* * * * *